United States Patent [19]

Cameron

[11] Patent Number: 4,722,498
[45] Date of Patent: Feb. 2, 1988

[54] INFLATABLE AIR FOIL

[76] Inventor: Robert W. Cameron, 7725 115th Pl. NE., Kirkland, Wash. 98033

[21] Appl. No.: 792,543

[22] Filed: Oct. 29, 1985

[51] Int. Cl.⁴ .............................................. B64B 1/50
[52] U.S. Cl. .................... 244/153 R; 244/33; 441/30; 441/2; 441/23; 116/210; 141/114; 141/329
[58] Field of Search ........... 244/153 R, 155 R, 155 A, 244/DIG. 1.1, DIG. 1.3, 33, 152, 198, 35 R; D21/88, 89; 116/210; 441/30, 31, 2, 6, 7, 9, 20, 23–26; 446/220, 225; 137/223; 141/10, 68, 114, 313, 19, 329, 330

[56] References Cited

U.S. PATENT DOCUMENTS

| | | | |
|---|---|---|---|
| 2,867,799 | 1/1959 | Decarie | 340/366 |
| 2,966,674 | 12/1960 | Clark | 340/366 |
| 2,999,657 | 5/1961 | Clark | 244/91 |
| 3,003,722 | 10/1961 | Pohl | 244/153 R |
| 3,154,050 | 10/1964 | Hanson | 116/124 |
| 3,253,573 | 5/1966 | Ashline | 116/124 |
| 3,270,895 | 5/1966 | Stewart | 244/153 R |
| 3,279,419 | 10/1966 | Demarro | 244/153 R |
| 3,395,877 | 8/1968 | MacFadden et al. | 116/210 |
| 3,487,810 | 1/1970 | Clement | 441/30 |
| 3,521,836 | 7/1970 | Struble, Jr. | 244/DIG. 1.3 |
| 3,592,157 | 9/1971 | Schwartz | 116/124 B |
| 3,616,569 | 11/1971 | Litt et al. | 446/220 |
| 3,721,983 | 3/1973 | Sherer | 343/18 B |
| 3,791,611 | 2/1974 | Babbidge | 244/153 R |
| 3,796,181 | 3/1974 | Collins | 116/124 B |
| 3,951,260 | 4/1976 | Frazee | 206/223 |
| 4,029,273 | 6/1977 | Christoffel, Jr. | 244/153 R |
| 4,042,882 | 8/1977 | Camacho et al. | 116/210 |
| 4,044,711 | 8/1977 | Jamison | 244/33 |
| 4,094,267 | 6/1978 | Davis, Jr. | 116/210 |
| 4,120,259 | 10/1978 | Wilson | 116/210 |
| 4,533,099 | 8/1985 | Stewart | 244/153 R |
| 4,586,456 | 5/1986 | Forward | 244/33 |

Primary Examiner—Joseph F. Peters, Jr.
Assistant Examiner—Lynn M. Fiorito
Attorney, Agent, or Firm—Seed and Berry

[57] ABSTRACT

A non-rigid, gas inflatable airfoil having a bulbous inflatable forward body and three spaced-apart rearwardly extending inflatable tails. The tails are attached to the rearward portion of the body and form with the body a single inflatable chamber. The central tail is yieldably biased into an upwardly inclined position, and a pair of sheets extend between the tails. The airfoil has a generally delta shape and provides a positive lift when exposed to wind. The airfoil is connected to a single tie down line by a single attachment member and swivel attached to a central portion of the underside of the body. The body and tails have sufficient interior gas containing volume that when filled with a lighter-than-air gas will offset the weight of the airfoil. The bulbous body contains enough lighter-than-air gas that the airfoil assumes a vertical orientation with the body above the tail when in the water or in the air without wind. The body exits the water first and assists in pulling the tails free of the water to allow the airfoil to be inflated underwater and overcome the adhesive force and the weight of the water on the airfoil to allow it to fully exit the water without assistance.

8 Claims, 9 Drawing Figures

U.S. Patent  Feb. 2, 1988  Sheet 1 of 4  4,722,498
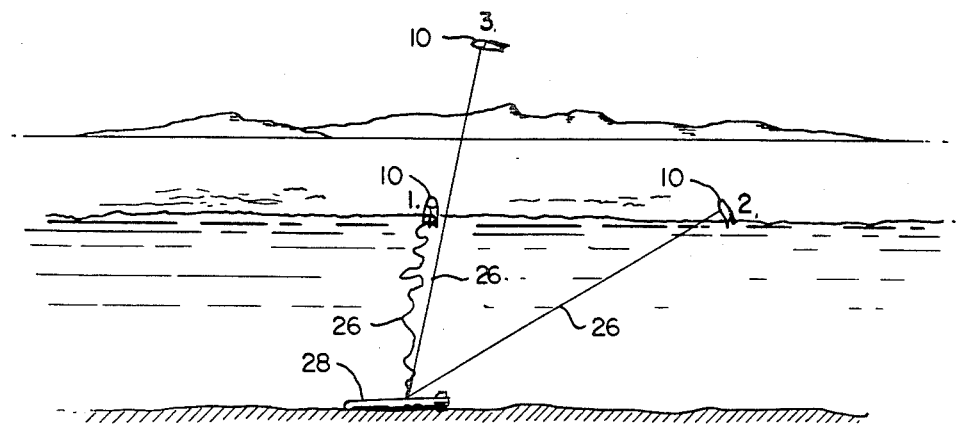
FIG. 1
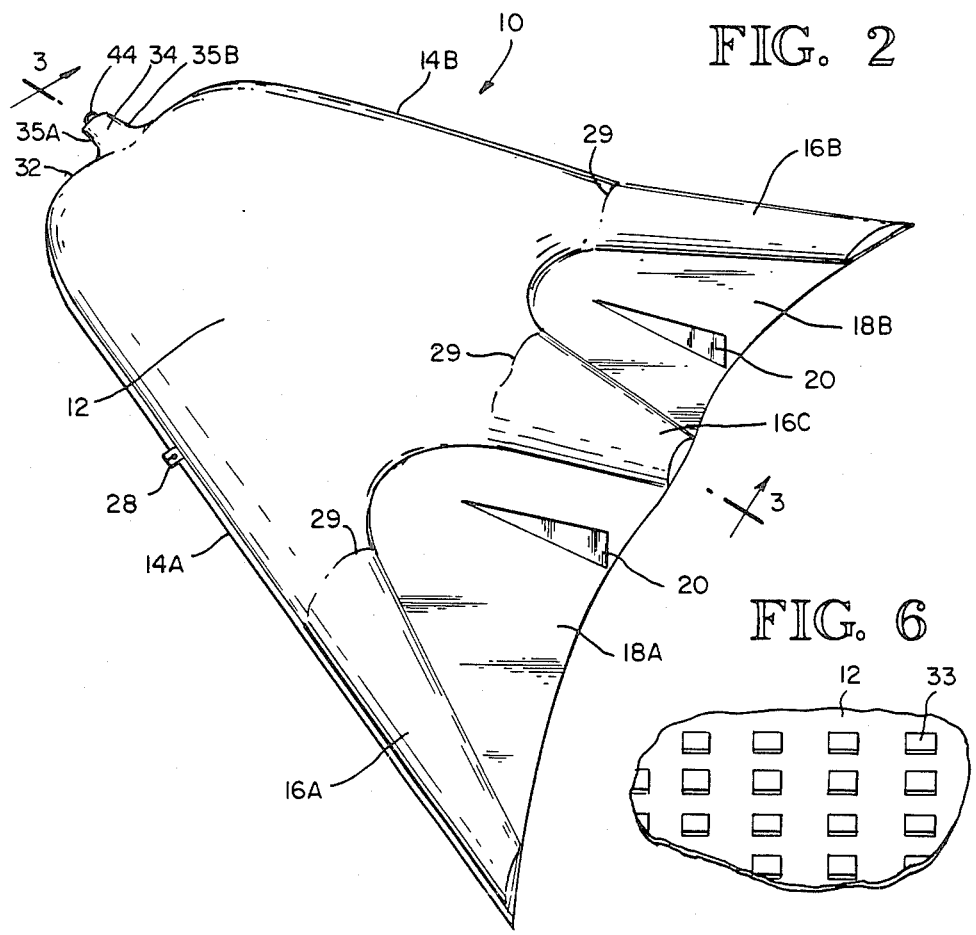
FIG. 2
FIG. 6

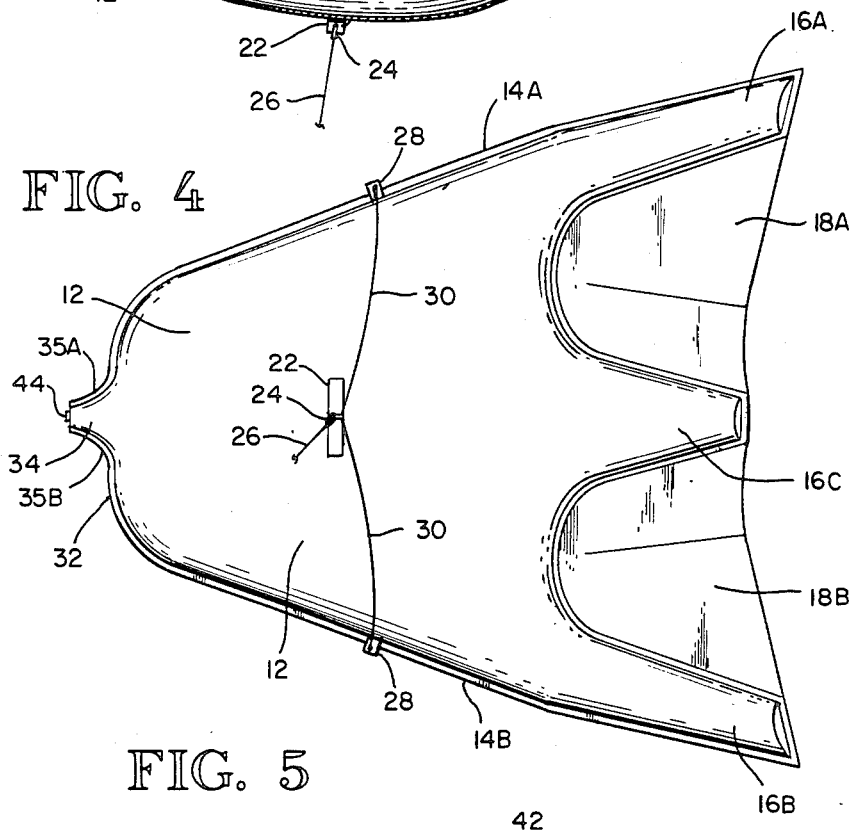

INFLATABLE AIR FOIL

TECHNICAL FIELD

The present invention relates to inflatable airfoils, and particularly, to non-rigid inflatable airfoils used in search and rescue and for location and recovery of unmanned marine craft.

BACKGROUND OF THE INVENTION

Inflatable balloons and kite-like lighter-than-air-structures have been utilized in the past for search and rescue, and just for the enjoyment of flying them. Such structures can to be used to save lives when a boatsman, hunter, hiker or other outdoorsman becomes lost, injured or otherwise in need of help. Many times such individuals are not equipment with radio devices to accomplish the communication necessary to assist in locating them. While organized search and rescue teams are often able to locate an injured or lost person, the search is made difficult and sometimes impossible by rough terrain, weather, nightfall or the large expanse needed to be searched.

While simple balloons filled with helium rise vertically in situations where there is no wind, even a slight wind is often enough to cause them to blow downwind and lose significant altitude. As such, they are not as visible to a searcher and the tether line or even the balloon itself can become entangled in trees. High winds can blow the balloon completely to the ground. Presently known inflatable kites exhibit similar characteristics.

Another disadvantage of inflatable balloons and kites is that they lose considerable altitude when exposed to rain as a result of water droplets that accumulate on their surface. Furthermore, if released from under the water, such as is necessary when used as a signal device for location and recovery of sunken marine craft, they will many times not exit the water. The adhesive force the water applies to the device and the weight of any water that may collect on top of the device tends to keep the device trapped at the water's surface.

Particularly when used for the location and recovery of unmanned marine craft, it is important to have a signal device which automatically releases itself from its source of inflation upon reaching full inflation. Moreover, unlike some existing inflatable airfoil designs, no rigid stays should be required. This allows compact storage when deflated, and requires no manual operations to put the rigid stays in place in preparation for inflation.

In the past many airfoils have had a design which inherently require they have many control lines connecting them to the ground in order to fly. Having more than one such control or tether line increases the chance of entanglement and makes the stowage and release of the device more difficult and manufacture of the device more expensive. Furthermore, an airfoil with multiple control lines may require adjustment of the lines during flight to maintain altitude and a proper attitude. As such, the airfoil would be of little value for situations where the person using the airfoil was injured and unable to attend to flying the airfoil or where no person was available such as the recovery of an unmanned marine craft.

It will therefore be appreciated that there has been a significant need for an inflatable airfoil for use in search and rescue and for location of marine craft. When deployed, the airfoil should maintain its altitude even in severe winds and when exposed to rain. Furtermore, the airfoil should be able to exit the water without assistance if inflated while under the water. Particularly in this situation, the airfoil should provide means for self-activated release from its source of inflation. The airfoil should be of a non-rigid construction requiring no stays for stiffening, and be deployable merely by inflation without requiring the presence of a person to fix stays or otherwise prepare the airfoil for flight.

The airfoil should only require a single-point attachment to a single tie down line and require no user attention during flight. The airfoil should have a positive lift when exposed to wind sufficient to lift its own weight even without being inflated with a lighter-than-air gas so that it does not rely solely upon the gas to maintain its altitude. The airfoil should have a sufficiently small size so that it can be easily folded or stuffed into a small container, and be filled with a lighter-than-air gas such as helium from a reasonably small pressure bottle. When filled with lighter-than-air gas, the interior gas containing volume of the airfoil should be sufficient that the buoyancy of the gas will cause the airfoil to rise even in a condition of no wind. Moreover, the airfoil should have a simple and relatively inexpensive construction.

The present invention fulfills these needs and further provides other related advantages.

DISCLOSURE OF THE INVENTION

The present invention resides in a non-rigid, gas inflatable airfoil. The airfoil includes a bulbous inflatable forward body having laterally outward side portions tapering forward, and a pair of spaced apart, rearwardly extending inflatable tails. The tails are attached by a forward end portion to a rearward portion of the body. A sheet extends between the tails and the body. The sheet is attached by a forward edge portion to the rearward portion of the body, and by opposite laterally outward edge portions to laterally inward side portions of the tails. At least one substantially transversely protecting and rearwardly extending fin is attached to the sheet. The airfoil further includes means for attachment to the body of a single tie down line. The attachment means is connected to an underside of the body at a central portion thereof.

The laterally outward side portions of the body and tails have a continuous forward taper defining a generally delta shape. The tails are yieldably bendable in an upward direction within at least a limited angular range during use to hold the sheet in an upwardly extending, rearwardly inclined position relative to the body. The body and the tails form a single gas inflatable chamber formed by a pair of flexible sheet panels joined together by gas-tight edge seams. The body and the tails have sufficient interior gas containing volume that when filled with a gas which, at the same temperature and pressure as the ambient air, is less dense than the air, will offset the weight of the airfoil in the ambient air. The interior gas volume is sufficient to offset the weight of water droplets which may accumulate on the airfoil surface due to rain. Moreover, the interior gas volume and weight of the body is sufficiently large compared to the interior gas containing volume and weight of the tails that the airfoil when inflated with a gas when underwater will rise through the water with the body above the tail. When filled with a gas which is lighter than air, the body will exit the water first and assist in pulling the tails free of the water.

The tails taper in height and width in the rearward direction. In one embodiment the airfoil includes a rearwardly extending, inflatable central tail positioned between the pair of tails. The central tail is attached by a forward end portion thereof to the rearward portion of the body. In this embodiment, the sheet includes a pair of sheet portions. Each sheet portion extends between and is attached to the central tail and to an opposite one of the pair of tails. The central tail is yieldably and resiliently biased into an upwardly inclined position. A pair of spaced apart fins are provided, one fin being attached to each of the pair of sheet portions.

The airfoil has a metalized radar reflective surface. To improve radar reflectivity, the exterior surface of the body has a plurality of radar reflective flat members attached thereto in face-to-face relation.

The body of the airfoil also includes a forward portion with a forwardly projecting, inflatable neck. The neck is forwardly tapering to be received within an outwardly flared collar and to interact therewith as the body is inflated. The neck expands upon inflation of the body and provides a force pulling the neck from the collar for automatic release therefrom upon the body reaching a preselected inflation pressure. The airfoil further includes means for communicating the gas under pressure from a source of pressurized gas through an injection means located in the collar for providing the gas under pressure to the airfoil. The gas is provided to the interior of the body and the means for communicating the gas is positioned in the neck for interaction with the injection means in the collar.

The exterior shape of the airfoil defines a lifting body with a positive lift which when exposed to wind is sufficient to offset the weight of the airfoil. The attachment means includes a swivel to allow the airfoil to swivel about the tie down line, whereby the airfoil is free to turn into the wind whereupon the lifting action of the airfoil resulting from the wind will lift the airfoil. Safety lines are connected to the laterally outward side portions of the body and to the tie down line in the event the attachment means attaching the single tie down line to the central portion of the body is disconnected. Other features and advantages of the invention will become apparent in the following detailed description, taken in conjunction with the accompanying drawings.

BRIEF DESCRIPTION OF THE DRAWINGS

FIG. 1 is a side elevational view of an inflatable airfoil of the present invention shown in three positions during deployment as a position indicator signal for a sunken marine craft.

FIG. 2 is an enlarged, isometric view of a first embodiment of the airfoil of the present invention.

FIG. 3 is a reduced scale sectional view taken substantially along the lines 3—3 of FIG. 2.

FIG. 4 is a reduced scale bottom view of the airfoil of FIG. 2.

FIG. 5 is an enlarged elevational view of the self-releasing inflation neck portion of the airfoil of FIG. 2 showing a cooperating collar used in conjunction with a helium bottle to inflate the airfoil.

FIG. 6 is an enlarged, fragmentary view of a portion of the exterior surface of the airfoil of FIG. 2 using rectangular pieces of metalized mylar attached to the surface to improve radar visibility.

BEST MODE FOR CARRYING OUT THE INVENTION

Figure 7:
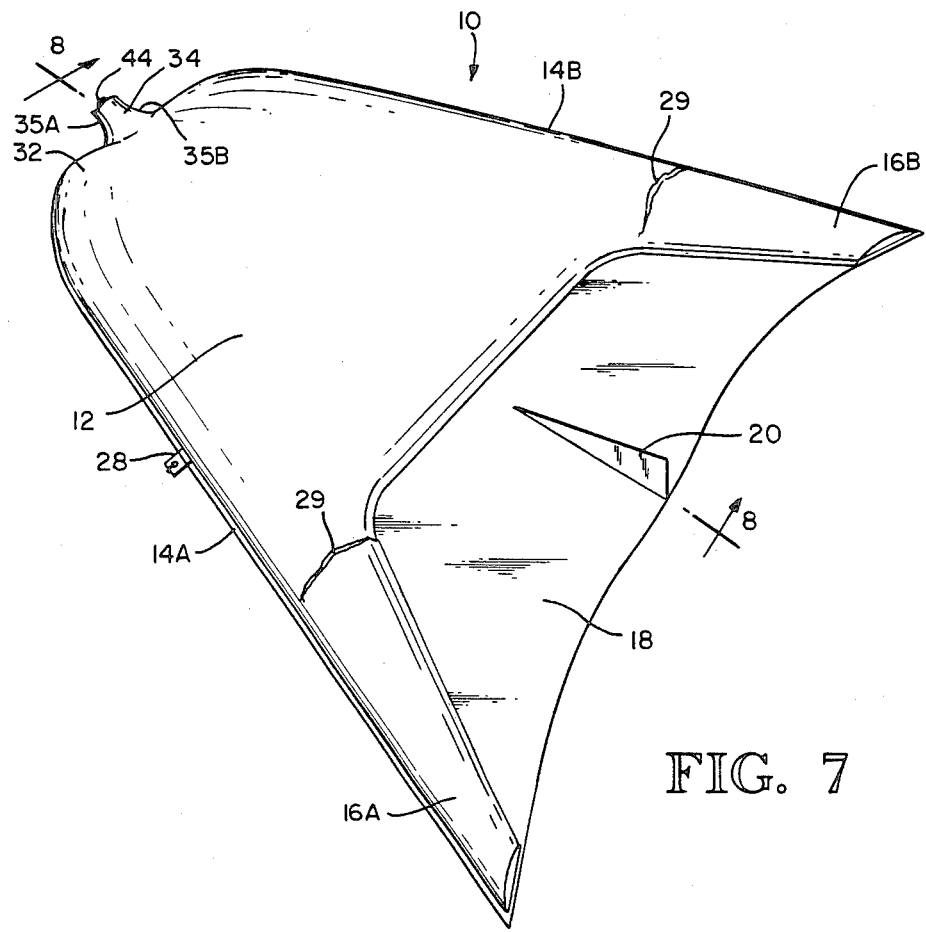
FIG. 7 is an isometric view of a second embodiment of the airfoil of the present invention.

As shown in the drawings for purposes of illustration, the present invention is embodied in an inflatable airfoil 10. A first embodiment of the airfoil 10 is shown in FIG. 2 and includes a bulbous inflated forward body 12 having laterally outward left and right side portions 14A and 14B, respectively. Attached to a rearward portion of the body are a pair of left and right laterally spaced apart tails 16A and 16B, respectively, and a central tail 16C positioned therebetween. The tails are inflatable and form a single gas inflatable chamber with the body.

The tails extend rearwardly from the body 12 and somewhat loosely extending between each of the lateral tails 16A and 16B and the central tail 16C are left and right flexible sheets 18A and 18B, respectively. Each of the sheets 18A and 18B is attached by a forward edge portion to the rearward portion of the body 12, and by its opposite laterally outward edge portions to a laterally inward side portion of one of the lateral tails and the central tail. The tails provide sufficient rigidity to support and maintain the position of the sheets during usage.

Attached to each of the sheets 18A and 18B is an upwardly projecting and rearwardly extending fin 20. The fin progressively increases in height in the rearward direction as it extends from a position adjacent to the rearward portion of the body to a position adjacent to a rearward edge portion of each sheet.

As best shown in FIGS. 3 and 4, the airfoil 10 includes a single attachment member 22 attached to the underside of the body at a centrally located position. Connected to the attachment member 22 is a swivel 24 to which is connected a single tie down line 26. Unlike many airfoils, the present invention requires only a single tie down line for control. As shown in FIG. 1, the tie down line 26 may be connected to an unmanned underwater marine craft 28 which is to have its position marked by the airfoil.

A shown in FIG. 4, secondary attachment members 28 are connected to each of the laterally outward sides 14A and 14B of the body 12 to provide an attachment point for a pair of safety lines 30 which each extend from one of the secondary attachment members inward to the tie down line. The safety lines tied to the tie down line at a point slightly spaced from the attachment member 22. In the event that the attachment member 22 should fail or become disconnected from the body 12, or the tie down line 26 should break between the point of connection to the attachment member 22 and the point at which the safety lines 30 are tied to the tie down line, the safety lines will maintain the airfoil 10 connected to the tie down line. It is noted that during normal operation of the airfoil, the safety lines provide no control of the airfoil and it is connected to the ground only by the single tie down line through a single point of attachment.

As will be described in more detail below, the airfoil has desirable flight characteristics which allow it to maintain its altitude in substantial winds which would blow down conventional balloons and airfoils. With the present invention, the swivel 24 allows the airfoil to turn freely about the tie down line 26 and to turn into the wind whereupon the lifting up, rather than blowing down action of the airfoil results in the wind lifting the airfoil. If the wind direction shifts, the airfoil can feely turn about to again face into the wind. In tests, the airfoil of the present invention has been successfully flown in winds of up to 35 knots.

In the presently preferred embodiment of the invention the airfoil 10 has a generally delta shape with the laterally outward side portions 14A and 14B of the body 12 and the laterally outward side portions of the lateral tails 16A and 16B having, in combination, a continuous forward taper to a truncated forward end 32 of the body. In other words the body and the lateral tails flare outward in the rearward direction. The airfoil 10 requires no stays to provide stiffness, and the airfoil may be folded up when deflated. The airfoil will unfold when inflated and assume its proper shape for flight without requiring operator intervention to insert stays or for any other purpose.

The tails 16A, 16B and 16C are yieldably bendable in an upward direction within at least a limited angular range during use. In the presently preferred embodiment of the invention, the central tail 16C tends to be yieldably and resiliently biased into an upwardly inclined position, such as shown in FIG. 3. While the lateral tails 16A and 16B may also assume such a position, the central tail tends to have an upward tilt greater than that of lateral tails. The upwardly inclined position of the central tail holds the sheets 18A and 18B in a rearwardly extending, upwardly inclined position relative to the body 12. The slight looseness of the sheets forms shallow pockets which can bulge out when catching the air during flight. This tends to provide the desired lifting reaction force when the air surrounding the airfoil is moving to cause the airfoil to have a positive lift. As such, when exposed to even minimal wind, the lift is sufficient to offset the weight of the airfoil, even when inflated with only air. The tails taper in height and width in the rearward direction.

The body 12 and the tails 16A, B and C are formed by a pair of flexible sheet panels joined together at continuous, heat sealed gas-tight edge seams. The sheets 18A and 18B are formed from a portion of the upper panel extending between the tails, with the lower panel being cut away in the area of the sheets 18A and 18B to provide a single layer. It has been found that the flight characteristics of the airfoil are improved if the seam defining the rearward portion of the body 12 extending between the tails has an arcuate shape with the arch projecting forwardly.

The fins 20 are each formed by making a fold in the sheet and heat sealing the fold to hold it together. The forming of the fins also serves to gather up the sheets 18A and 18B, much like a dart does in sewing fabric, to provide the desired degree of tautness in the sheets to encourage the tails, particularly the central tail, to assume the upwardly inclined position and provide a positive lift to the airfoil. It is noted that the force of wind on the central tail, when the airfoil is initially launched and has a vertical attitude, tends to cause the airfoil to assume a horizontal attitude and to cause the central tail 16C to buckle along a crease line 29. Similar crease lines are formed in the lateral tails 16A and 16B.

The airfoil is manufactured from sheets of aluminized mylar to provide a metalized surface which is radar reflective. To further increase the radar reflectivity of the airfoil 10, the exterior surface of the body 12 is covered with many radar-reflective, rectangular-shaped pieces of metalized mylar 33 adhered thereto in a face-to-face relation with the surface of the body (see FIG. 6). This arrangement provides increased radar cross section for the airfoil making it even more visible to radar.

The body 12 and the tails 16A, B and C collectively have sufficient interior gas containing volume that when filled with a gas which, when at the same temperature and pressure as ambient air, is less than the air, will offset the weight of the airfoil in the ambient air. As such, when filled with a gas like helium, the airfoil 10 will rise even in a condition of no wind. When filled with helium, and without wind, it is noted that the airfoil assumes a vertical orientation or attitude with the body above the tails. This is a result of the particular weight distribution of the airfoil and the use of the large bulbous body containing a relatively large proportion of the gas within the airfoil. When wind is encountered, the airfoil assumes a horizontal attitude.

The interior gas containing volume of the body 12 is sufficiently large compared to the interior gas containing volume of the tails 16A, B and C that the airfoil when inflated with gas when underwater will rise through the water with the body above the tails. When that gas is one lighter than air, such as helium, the body has sufficient interior gas containing volume that the body will exit the water first and then assist in pulling the tails free of the water. Moreover, when flying, the body and tails have sufficient interior gas containing volume to offset the extra weight of water droplets which accumulated on the airfoil surface due to rain.

The airfoil 10 is shown in three positions in FIG. 1, with the first position showing the airfoil exiting the water with the body first. In the second position, the airfoil is shown with the tie down line 26 taunt as a result of either the wind engaging the airfoil as it exits the water or the water currents pulling the airfoil downstream. The helium in the body will overcome the adhesive force and weight of the water on the airfoil and cause it to fully exit the water without assistance. This allows the airfoil to be inflated under water and, unlike many conventional balloons and airfoils which cannot pull free of the surface of the water, the airfoil of the present invention will exit the water by itself, and then rise in the air. The exterior shape of the airfoil defines a lifting body with a positive lift, and if wind is present, the airfoil will lift upward and assume the orientation shown in the third position of FIG. 1. It is noted that rather than being blown down by high winds as occurs with conventional balloons and airfoils, the wind actually assists in lifting the airfoil of the present invention and causes it to assume a position substantially directly above the object to which the tie down line 26 is attached.

The forward portion 32 of the body 12 is provided with a forwardly projecting, inflatable neck 34. The neck has forwardly tapering laterally outward left and right portions 35A and 35B, respectively, and is received in a cooperating outwardly flared collar 36 shown in FIG. 5. The collar 36 is attached to a pressurized helium bottle 38 having an inflation needle 40 projecting therefrom into a central opening 42 in the collar. The neck of the airfoil has a cylindrical block 44 having an interior aperture (not shown) to receive the needle for inflation of the airfoil.

The aperture is closed when the needle is removed by a one-way flap valve (not shown). The neck 34 is positioned for inflation within the central opening 42 of the collar 36 with the needle projecting into the block 44. The laterally outward side portions of the neck have a curvature generally conforming to that of the outwardly flared collar 36, but with the neck being sized such that upon inflation of the airfoil to a preselected inflation pressure, the neck will expand and provide a force which pulls the neck from the collar and the block from the needle 40 for automatic release of the airfoil from the helium bottle 38. In this manner, the pressure from the helium bottle can be released at a preselected time using a conventional self-activating mechanism and the airfoil will be inflated and deployed without the requirement for the presence of an operator.

Figure 8:
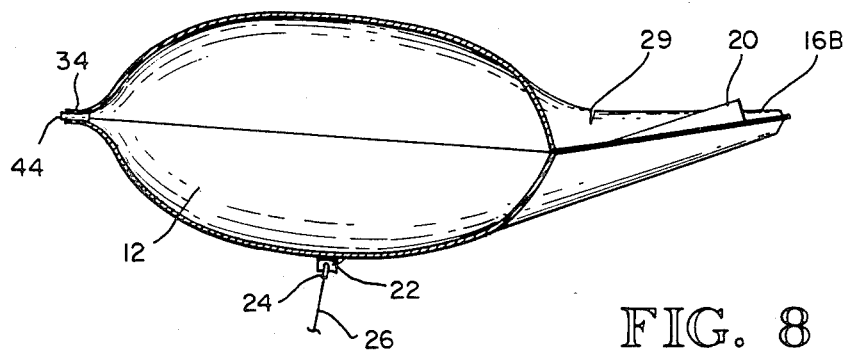
FIG. 8 is a reduced scale sectional view taken substantially along the lines 8—8 of FIG. 7.
Figure 9:
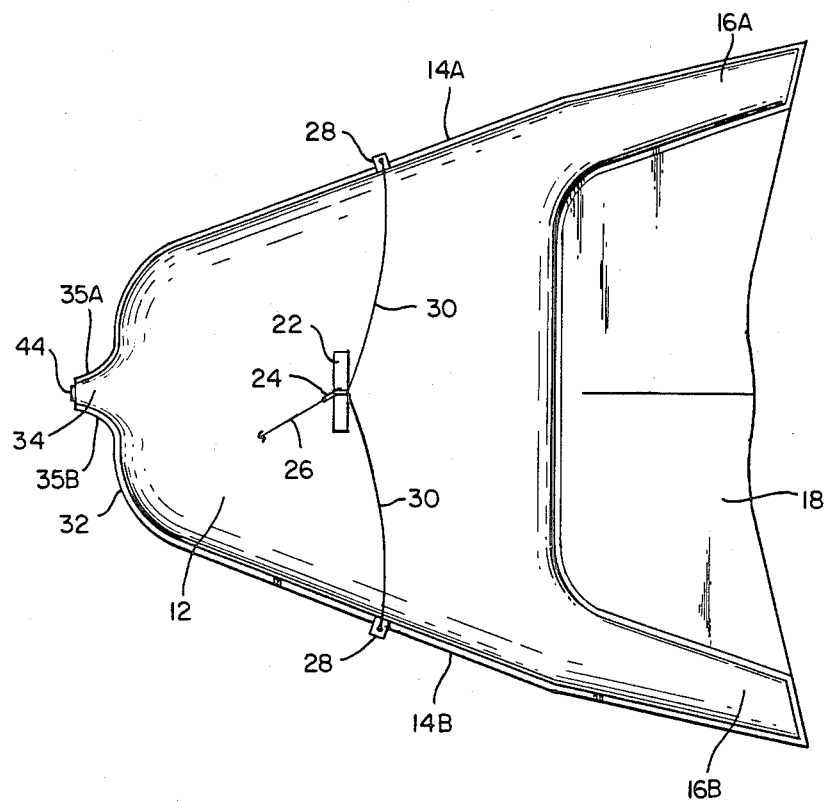
FIG. 9 is a reduced scale bottom view of the airfoil of FIG. 7.

An alternative second embodiment of the invention is shown in FIGS. 7, 8 and 9. In this embodiment, the airfoil 10 has no central tail and utilizes a single sheet 18 extending between the lateral tails 16A and 16B. The lateral tails tend to be yieldably and resiliently biased into an upwardly inclined position, such as shown in FIG. 8. A single fin 20 is used centrally positioned between the tails. In most other respects this embodiment of the invention is the same as described for the first embodiment and like components have been given the same reference numerals.

It will be appreciated that, although specific embodiments of the invention have been described herein for purposes of illustration, various modifications may be made without departing from the spirit and scope of the invention. Accordingly, the invention is not limited except by the appended claims.

I claim:

1. A non-rigid, gas inflatable airfoil for use with an outwardly flared collar, comprising:
   a bulbous, inflatable forward body having laterally outward side portions tapering forward, said body having a forward portion with a forwardly projecting, inflatable neck, said neck being forwardly tapering to be received within the outwardly flared collar and to interact therewith as said body is inflated, said neck expanding upon inflation of said body and providing a force pulling said neck from the collar for automatic release therefrom upon said body reaching a preselected inflation pressure;
   a pair of spaced apart, rearwardly extending inflatable tails, said tails being attached by a forward end portion thereof to a rearward portion of said body;
   a sheet extending between said tails and said body, said sheet being attached by a forward edge portion to said rearward portion of said body, and by opposite laterally outward edge portions to laterally inward side portions of said tails; and
   means for attachment to said body of a tie down line, said attachment means being connected to an underside of said body at a central portion thereof.

2. The airfoil of claim 1 for use with a source of pressurized gas and injection means located in the collar for providing the gas under pressure to the airfoil, further including means for communicating the gas under pressure from the source to the interior of said body, said means being positioned in said neck of said body for interaction with the injection means in the collar.

3. A non-rigid, gas inflatable generally delta shaped airfoil, comprising:
   a bulbous, inflatable forward body having a truncated forward end with a blunted and generally flattened forward face, said forward body further having laterally outward side portions tapering forward;
   three spaced apart, rearwardly extending inflatable tails, said tails being attached by a forward end portion thereof to a rearward portion of said body, said three tails including a pair of laterally outward positioned tails and a central tail positioned therebetween, said central tail being yieldably and resiliently biased into a rearwardly extending, upwardly inclined position, said lateral tails each having a laterally outward side portion angled laterally inward relative to the corresponding one of said body side portions to position said tails inwardly from a conventional delta shape toward the longitudinal central axis of the airfoil;
   a pair of sheets each extending between an opposite one of said lateral tails and said central tail, each of said sheets being attached by a forward edge portion of said rearward portion of said body, and by opposite laterally outward edge portions to laterally inward side portions of one of said lateral tails and said central tail, said sheets applying a laterally inward force on said tails to maintain said tails in said inward position, the exterior shape of the airfoil providing a positive lift when exposed to wind sufficient to offset the weight of the airfoil, said body and said tails have sufficient interior gas containing volume that when filled with a gas which, at the same temperature and pressure as the ambient air, is less dense than the air, will offset the weight of the airfoil in the ambient air, and when inflated with the gas when under water, will exit the water with said body above said tails and pull said tails free of the water;
   at least one substantially transversely projecting and rearwardly extending fin attached to each of said pair of sheets, said fins being formed from darts in said sheets sized to provide said laterally inward force on said lateral tails to maintain said lateral tails in said inward position; and
   means for attachment to said body of a tie down line.

4. A non-rigid, gas inflatable generally delta shaped airfoil, comprising:
   a bulbous, inflatable forward body having a truncated forward end with a blunted and generally flattened forward face, said forward body further having laterally outward side portions tapering forward;
   two spaced apart, rearwardly extending inflatable generally delta shaped tails, said tails being attached by a forward end portion thereof to a rearward portion of said body, said tails being yieldably and resiliently biased into a rearwardly extending, upwardly inclined position, said tails each having a laterally outward side portion angled laterally inward relative to the corresponding one of said body side portions to position said tails inwardly from a conventional delta shape toward the longitudinal central axis of the airfoil;
   a sheet extending between said tails and attached by a forward edge portion to said rearward portion of said body, and by laterally outward edge portions to laterally inward side portions of said tails, said sheet applying a laterally inward force on said tails to maintain said tails in said inward position, the exterior shape of the airfoil providing a positive lift when exposed to wind sufficient to offset the weight of the airfoil, said body and said tails have sufficient interior gas containing volume that when filled with a gas which, at the same temperature and pressure as the ambient air, is less dense than the air, will offset the weight of the airfoil in the ambient air, and when inflated with the gas when under water, will exit the water with said body above said tails and pull said tails free of the water;

a substantially transversely projecting and rearwardly extending fin attached to said sheet, said fin being formed from a dart in said sheet sized to provide said laterally inward force on said tails to maintain said tails in said inward position; and means for attachment to said body of a tie down line.

5. A non-rigid, gas inflatable airfoil for use with a release collar, comprising:

a bulbous, inflatable forward body having laterally outward side portions tapering forward, said body having a forward portion with a width greater than the diameter of the collar and receivable within the collar, said forward portion interacting with the collar as said body is inflated and providing a force pulling said forward portion away from the collar for automatic release therefrom upon said body reaching a preselected inflation pressure;

a pair of spaced apart, rearwardly extending inflatable tails, said tails being attached by a forward end portion thereof to a rearward portion of said body;

a sheet extending between said tails and said body, said sheet being attached by a forward edge portion to said rearward portion of said body, and by opposite laterally outward edge portions to laterally inward side portions of said tails; and means for attachment to said body of a tie down line, said attachment means being connected to an underside of said body at a central portion thereof.

6. A non-rigid, gas inflatable airfoil for use with an outwardly flared collar, comprising an inflatable body having a portion with an outwardly projecting, inflatable neck, said neck being forwardly tapering to be received within the outwardly flared collar and to interact therewith as said body is inflated, said neck expanding upon inflation of said body and providing a force pulling said neck from the collar for automatic release therefrom upon said body reaching a preselected inflation pressure.

7. The airfoil of claim 6 for use with a source of pressurized gas and injection means located in the collar for providing the gas under pressure to the airfoil, further including means for communicating the gas under pressure from the source to the interior of said body, said means being positioned in said neck of said body for interaction with the injection means in the collar.

8. A non-rigid, gas inflatable airfoil for use with a release collar, comprising an inflatable body having a portion with a width greater than the diameter of the collar and receivable within the collar, said portion interacting with the collar as said body is inflated and providing a force pulling said portion away from the collar for automatic release therefrom upon said body reaching a preselected inflation pressure.

* * * * *